UNITED STATES PATENT OFFICE.

IGNAZ KREIDL, OF VIENNA, AUSTRIA.

PROCESS OF SEPARATING THORIUM FROM SODA SOLUTIONS CONTAINING THORIUM OXALATE.

1,232,334.     Specification of Letters Patent.     Patented July 3, 1917.

No Drawing.     Application filed April 18, 1916. Serial No. 92,036.

*To all whom it may concern:*

Be it known that I, Dr. IGNAZ KREIDL, partner of the firm Vereinigte Chemische Fabriken, Kreidl, Heller & Co., of Vienna, XXI, Sebastian-Kohlgasse 5–7, a subject of the Emperor of Austria, residing at Vienna, in the Empire of Austria, XXI, Sebastian-Kohlgasse 5–7, have invented certain new and useful Processes for Separating Thorium from Soda Solutions Containing Thorium Oxalate, of which the following is a specification.

What is known as the "soda process" is employed for separating thorium from the rare earths in the case of products in which the percentage of thorium has been increased as compared to the content in the initial material. In that process oxalates which have been considerably enriched with thorium, are treated with a warm solution of sodium carbonate whereby the greater part of the thorium oxalate is dissolved, while the cerite earths remain undissolved in the residue. Hitherto the thorium has been separated out of this solution either by precipitating pure oxalate by means of an acid from the thorium-containing solution, said oxalate being then converted by means of alkalis or ammonia into hydrate, this hydrate being converted in the usual manner into nitrate or the salt which it is desired to produce; or the thorium-containing solution was precipitated directly by means of an excess of alkalis or ammonia, the precipitated hydrate being treated as above described.

The present invention has now for its object a process according to which the thorium is separated out of the thorium-containing soda solution in the form of a pure hydrate, without the help of reagents. The process consists in diluting the thorium-containing soda solution very highly with water, and then heating it. At a temperature of about 90° C. the whole of the thorium is precipitated in the form of a hydrate or carbonate which is free from oxalic acid and also free from alkali. It is merely necessary to filter this hydrate and to dissolve it in acid in order to produce the salt which it is desired to manufacture. The process according to this invention, is distinguished, apart from the fact of its economy in chemicals, also by the circumstance that the separating-out can be effected in a comparatively short time.

*Example.*

A solution of thorium-oxalate, containing say 7–10% of sodium carbonate, is diluted in the proportion of about 1:5 and then heated to about 90°. This causes the thorium to separate out in the form of a hydrate (containing carbonic acid), free from oxalic acid and free from alkali. The precipitate is filtered off and washed.

What I claim is:

1. A process of precipitating thorium compounds from a sodium carbonate solution containing a salt of thorium dissolved therein, which comprises bringing said solution to a heated and highly diluted condition.

2. A process for the separating out of thorium compounds from sodium carbonate solutions containing thorium-oxalate, in which these solutions are highly diluted with water and are then heated.

3. A process of precipitating thorium compounds from a carbonate solution containing thorium-oxalate, which comprises highly diluting said solution with water and heating the diluted solution to about 90° C.

In testimony whereof I affix my signature in presence of two witnesses.

DR. IGNAZ KREIDL.

Witnesses:
   HUGO REIK,
   AUGUST FUGGER.